(12) United States Patent
Harbison et al.

(10) Patent No.: US 12,416,207 B2
(45) Date of Patent: Sep. 16, 2025

(54) BUOYANCY MODULE

(71) Applicant: Advanced Innergy Ltd, Gloucester (GB)

(72) Inventors: Austin Harbison, Skelmersdale (GB); Jonathan Fox, Skelmersdale (GB)

(73) Assignee: Advanced Innergy Ltd, Gloucester (GB)

( * ) Notice: Subject to any disclaimer, the term of this patent is extended or adjusted under 35 U.S.C. 154(b) by 524 days.

(21) Appl. No.: 17/800,251

(22) PCT Filed: Feb. 17, 2021

(86) PCT No.: PCT/GB2021/050384
§ 371 (c)(1),
(2) Date: Aug. 17, 2022

(87) PCT Pub. No.: WO2021/165668
PCT Pub. Date: Aug. 26, 2021

(65) Prior Publication Data
US 2023/0067262 A1 Mar. 2, 2023

(30) Foreign Application Priority Data
Feb. 17, 2020 (GB) ...................................... 2002118

(51) Int. Cl.
*F16L 1/24* (2006.01)
*E21B 17/01* (2006.01)

(52) U.S. Cl.
CPC .............. *E21B 17/012* (2013.01); *F16L 1/24* (2013.01)

(58) Field of Classification Search
CPC .................................. E21B 17/012; F16L 1/24
See application file for complete search history.

(56) References Cited

U.S. PATENT DOCUMENTS

| 9,038,730 B2 * | 5/2015 | Smith .................... E21B 17/012 166/350 |
| 11,530,578 B2 * | 12/2022 | Harbison ................ E21B 7/122 |
| 2012/0247782 A1 | 10/2012 | Smith |
| 2019/0195025 A1 | 6/2019 | Tan et al. |

FOREIGN PATENT DOCUMENTS

| GB | 2561196 A | 10/2018 |
| KR | 20140037990 A | 3/2014 |
| WO | 2018/167186 A1 | 9/2018 |
| WO | 2018/185338 A1 | 10/2018 |
| WO | 2019028500 A1 | 2/2019 |

OTHER PUBLICATIONS

UK Intellectual Property Office, search report in App. No. GB2002118.4, Nov. 19, 2020, pp. 1-3.
European Patent Office, International Search Report in PCT App. No. PCT/GB2021/050384, May 4, 2021, pp. 1-3.
European Patent Office, Written Opinion in PCT App. No. PCT/GB2021/050384, May 4, 2021, pp. 1-6.
European Patent Office, English abstract for KR20140037990A, printed on Aug. 17, 2022.
UK Intellectual Property Office, Examination Report under Section 18(3) for App. No. GB2002118.4, Aug. 2, 2023, pp. 1-3.

* cited by examiner

*Primary Examiner* — Kyle Armstrong
(74) *Attorney, Agent, or Firm* — Cahn & Samuels, LLP (57) ABSTRACT

A buoyancy module (10, 12, 14) configured for mounting on an elongate underwater member (16) and provided with a sensor module dock (32) for receiving and releasably retaining a sensor module (30).

20 Claims, 15 Drawing Sheets

BUOYANCY MODULE

The present invention is concerned with monitoring of elongate underwater members.

The invention is applicable particularly, but by no means exclusively, to risers—tubular structures used in subsea extraction of hydrocarbons such as oil and gas to conduct the hydrocarbons from a wellhead on the seabed to a structure at the surface such as a floating rig. Risers suffer from a variety of factors which affect can cause damage and affect their working lifetime. The consequences of in-service failure of a riser could be severe and the cost of their replacement is large. Without some means of monitoring in-service performance of the riser, operators risk spending large sums replacing infrastructure based on what may be excessively conservative predictions of working lifetime.

Risers and other pipelines and cables can suffer a wide variety of internal and external loads during their working lifetime. One of the primary areas of interest in relation to risers is cumulative fatigue damage, where flexure can be induced by environmental or operational factors such as ocean currents. Another factor is vibration. Underwater members subject to flow (e.g. tidal flow) can suffer vortex induced vibration, in which the shedding of vortices from the downstream side of a member can lead to oscillation which can be amplified due to resonance effects. The product transported by a riser or pipeline may undergo changes that are of operational interest. Examples are changes of product temperature and/or pressure, which might be indicative of problematic formation of waxy deposits in a pipeline requiring intervention. Variations in density of the product conveyed may lead to slug induced vibration, where changes in mass distribution within a conduit initiate oscillatory behaviour. Pipelines on the seabed may suffer lateral buckling. This may be because heating causes a pipeline to expand longitudinally. It may be impossible for the expanding pipeline to move in the longitudinal direction, with the result that the increased length instead causes lateral curvature of the pipeline, with potentially damaging consequences.

For all of these and other reasons it is desirable to provide for in-service monitoring of factors relating to the performance of elongate underwater members.

Sensor devices for this purpose are known in the art which comprise an arrangement of sensors and some form of clamp or band to secure the sensor arrangement to the riser. An example is WO2018/185338A1. This discloses a sensor system having a semi-cylindrical portion that seats upon the pipeline and is removably retained upon it using magnets. The device has a temperature sensor and is configured to transmit data through the water using electromagnetic signals. Another example is WO2018/167186A1, which discloses a monitoring system deployed upon a riser and having "nodes" which are attached to the riser through mechanical clamps.

The attachment of clamps and other structures to a riser or pipeline may in itself be burdensome. If it is carried out during deployment, it introduces additional complexity at that stage. If sensor devices are instead mounted on the elongate member subsea, after its deployment, this is likely to involve divers or remotely operated vehicles and is in itself a potentially expensive and troublesome process.

The present inventor has recognised that significant advantages can be obtained by providing for a sensor unit to be mounted to a buoyancy module carried on the elongate underwater member.

Figure 1:
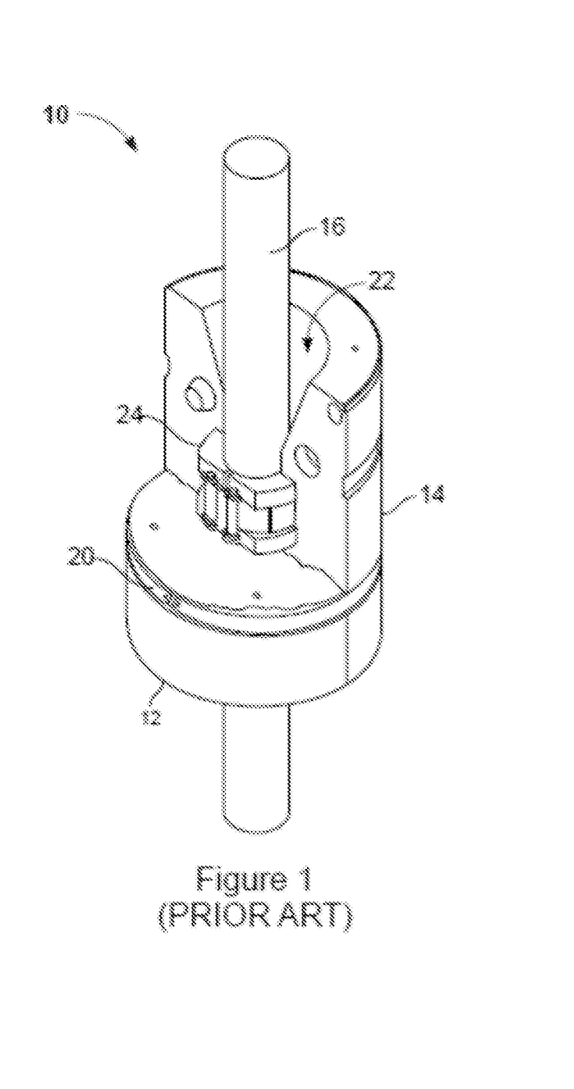
FIG. 1 is a partly sectional depiction of a distributed buoyancy module belonging to the prior art, mounted on an underwater elongate member.

Risers, pipelines and other elongate members deployed underwater are commonly provided with buoyancy which supports a part of the member's weight. Risers for example are provided with so-called distributed buoyancy modules at chosen locations, serving to support a part of the weight of the riser and often to maintain it in a chosen configuration such as the lazy "S" or steep "S" configurations which are well known to the skilled person. Suitable buoyancy modules come in a variety of forms but one example is depicted in FIG. 1. Here, buoyancy module 10 comprises a pair of semi-cylindrical module parts 12, 14 which together form a through-going passage 22 to receive the elongate member 16. Tension bands 20 passed around the buoyancy elements 12, 14 secure them together and a clamp 24 is seated on the elongate member 16 and received in an annular pocket within the buoyancy module 10 to locate it axially—that is, to prevent it from moving along the length of the elongate member 16. It is emphasised however that this form of construction is presented by way of example and not of limitation. Buoyancy modules used on elongate underwater members may take a variety of different forms.

It might be thought that buoyancy would be provided only on underwater members such as risers which are situated above the seabed (rather than resting upon it) but this is not the case. Pipelines on the seabed may be provided with buoyancy. One reason for this is to support a part of the weight of the pipeline and so facilitate lateral movement without buckling. Buoyancy and other means may be used to define zones in which lateral movement is to take place without damage to the elongate member.

In accordance with a first aspect of the present invention there is a buoyancy module configured for mounting on an elongate underwater member and provided with a sensor module dock for receiving and releasably retaining a sensor module.

By providing a buoyancy module with a sensor module dock, the present invention makes it possible to provide for convenient and removable mounting of sensor modules without necessitating any additional complexity or time during deployment of either the buoyancy module or the elongate member itself. A sensor module carried in the dock can be located in a known orientation with respect to the elongate member itself, making it straightforward for example to determine the orientation of the elongate member with respect to the earth's gravitational field or with respect to the earth's magnetic field. The sensor module carried in the dock can be arranged for straightforward retrieval and replacement using a remotely operated vehicle (ROV). Since a given elongate member often carries multiple buoyancy modules, the invention can provide numerous sites along the length of the elongate member at which to mount sensor modules. Buoyancy is often provided a significant locations on the elongate member, so that the present invention makes it possible to mount the sensor module in the region of most interest. For example in the case mentioned above in which buoyancy is used to facilitate lateral movement of a pipeline on the seabed, monitoring of movement in these regions is likely to be needed—and the present invention makes it possible to mount the sensor module in exactly these zones.

Specific embodiments of the present invention will now be described, by way of example only, with reference to the accompanying drawings, in which: —

Figure 2:
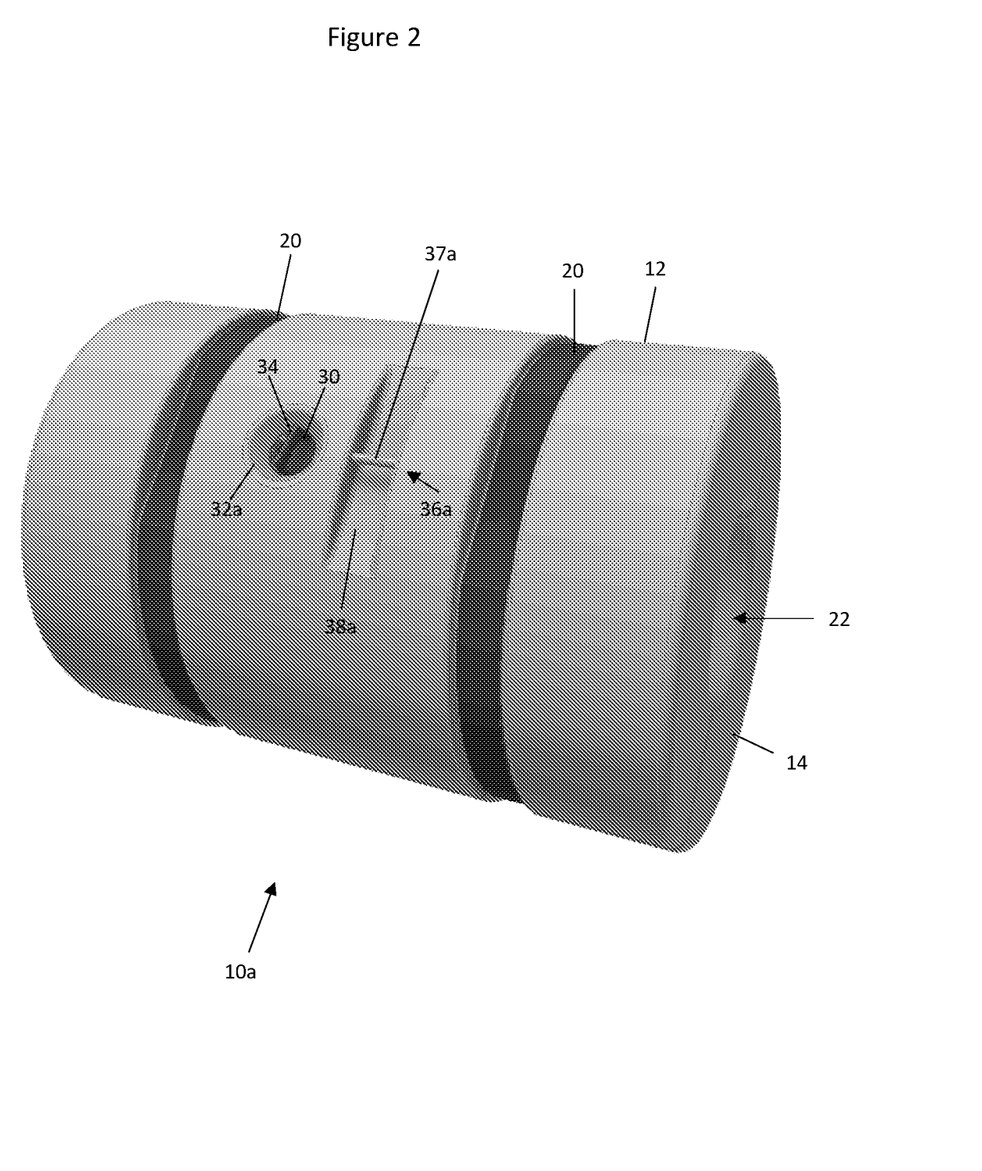
FIG. 2 depicts a buoyancy module embodying the present invention.

Referring to FIG. 2, a distributed buoyancy module 10 is depicted which is in various respects similar to the prior art item depicted in FIG. 1 and comprises a pair of semi-cylindrical parts 12, 14. It should be noted that the term "buoyancy module" is used herein to denote either of the assembly formed by the module parts 12, 14 and the module parts themselves. That is the parts 12, 14 are in themselves buoyancy modules. The module parts 12, 14 together form a through-going passage 22 to receive the elongate member, which is not itself seen in FIG. 2. Tension bands 20 run around the buoyancy module 10 to keep its two parts 12, 14 together and so retain it upon the elongate member. Some means is needed to resist longitudinal movement of the buoyancy module 10. This is not depicted in FIG. 2 but may for example comprise an internal clamp arrangement of the type seen in FIG. 1, or may take any of a variety of different forms. For example a string of buoyancy modules may have clamps at its axial ends. The buoyancy module 10 may seat on the elongate member with sufficient pressure to resist movement. The present invention is not restricted to any particular material or mode of manufacture of the buoyancy module 10 but in the present example it comprises a buoyant composite material, more specifically syntactic foam. Suitable syntactic foams are known to those skilled in the art and may comprise a thermoset resin such as epoxy with an admixture of density reducing elements such as glass macrospheres and/or microspheres. The illustrated buoyancy module 10 is formed by moulding but other manufacturing techniques may be adopted in other embodiments.

The buoyancy module 10a of FIG. 2 is seen to receive a sensor module 30 in a shaped sensor module dock 32a. The sensor module dock is, in this and various further embodiments to be described below, formed integrally with the buoyancy module 10a. It is a feature of shape of the buoyancy module 10a. The sensor module dock 32a may be formed in the buoyancy module 10a during its moulding. In the FIG. 2 embodiment it takes the form of a socket 32a formed in the buoyancy module 10a. Only a flared mouth of the sensor module dock 32a is seen in FIG. 2, its remainder being covered by the sensor module 30 itself, but the dock takes the form of a blind cylindrical recess extending radially with respect to the buoyancy module 10a. The sensor module 30 is in the FIG. 2 embodiment of complementary cylindrical shape so that it can easily be slid directly into the sensor module dock 32a.

The sensor module 30 may in practice be mounted to the buoyancy module 10a and retrieved from it using an ROV. For this purpose the sensor module 30 has a handle 34. Additionally the buoyancy module 10 is provided with an ROV locating feature 36a. In the present embodiment this comprises a grab bar 37a traversing a recess 38a in the buoyancy module. The ROV locating feature is proximate the sensor module dock 32a. Its purpose is to enable the ROV to engage with the buoyancy module 10a to maintain its position whilst retrieving or mounting the sensor module 30. With one robotic effector the ROV will engage with the feature 36a, in this example by grasping the grab bar. The ROV is thus stabilised while it mounts/retrieves the sensor module 30 with another effector.

Placement of the sensor module dock 32a on the exterior of the buoyancy module 10a means that the ROV can approach along a direction roughly radial to the elongate member, which is convenient.

Figure 3:
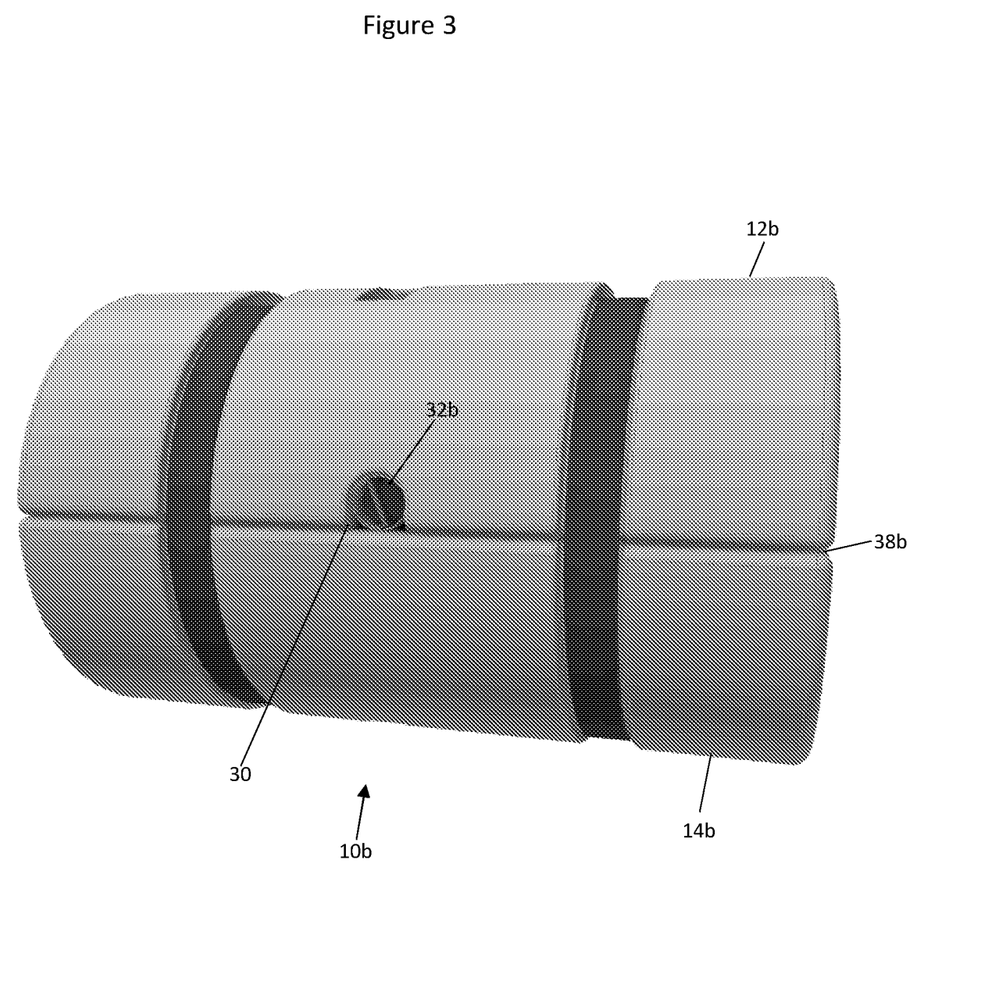
FIG. 3 depicts a further buoyancy module embodying the present invention.

Referring now to FIG. 3, the buoyancy module parts 12b, 14b meet each other through abutment faces which in the present embodiments lie in a plane containing the axis of the circular buoyancy module 10b. The abutment faces themselves are not seen in FIG. 3 but they form a split line 38b between the two buoyancy module parts 12b, 14b. In the buoyancy module 10b depicted in FIG. 3 the sensor module dock 32b comprises a recess which is open toward the abutment face/split line 38b. In this example the recess is "U" shaped. This formation is advantageous in that it does not complicate the moulding process, since the shape has no undercut which would inhibit release from the mould.

Figure 4:
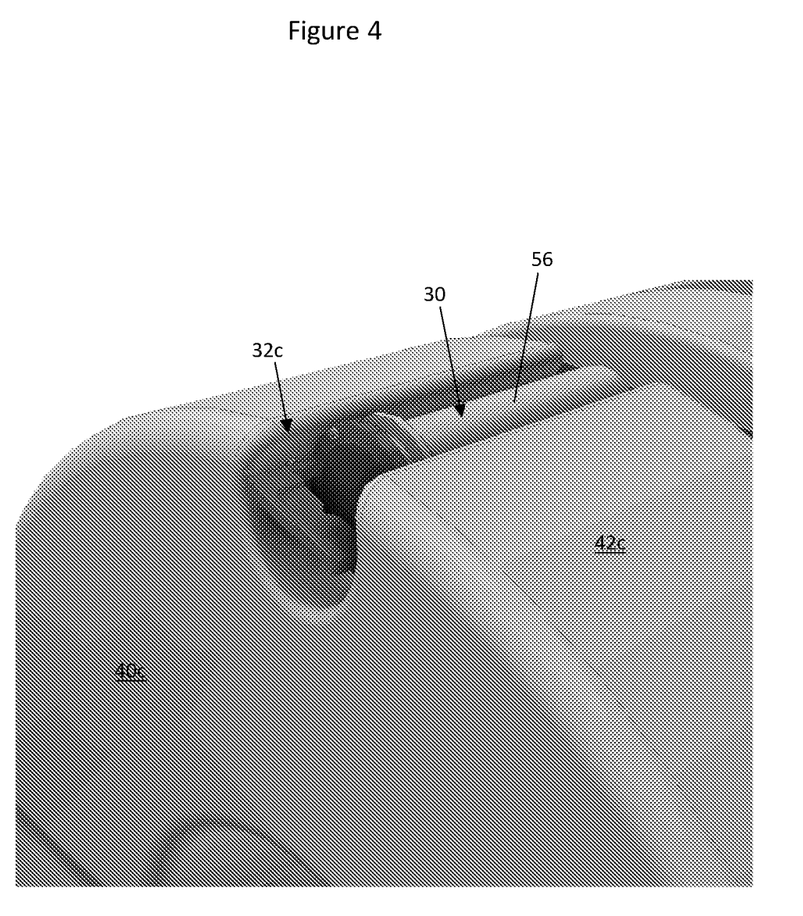
FIGS. 4 to 7 each depict part of a respective further buoyancy module embodying the present invention, including in each case a sensor module dock.
Figure 5:
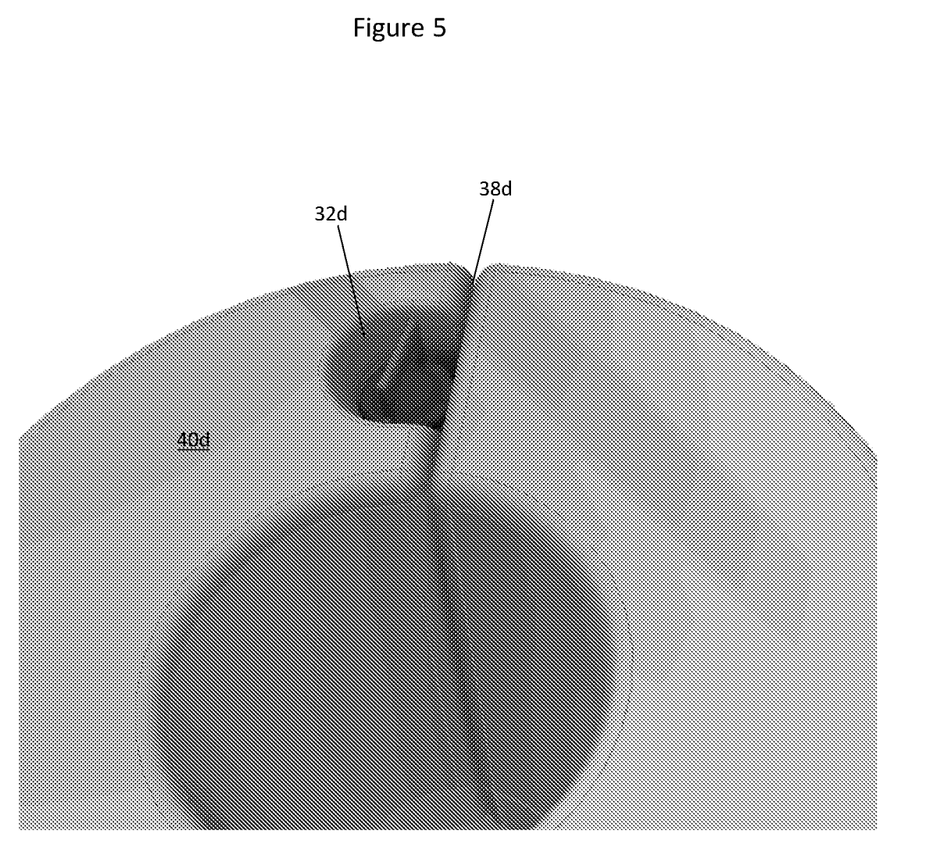
Figure 6:
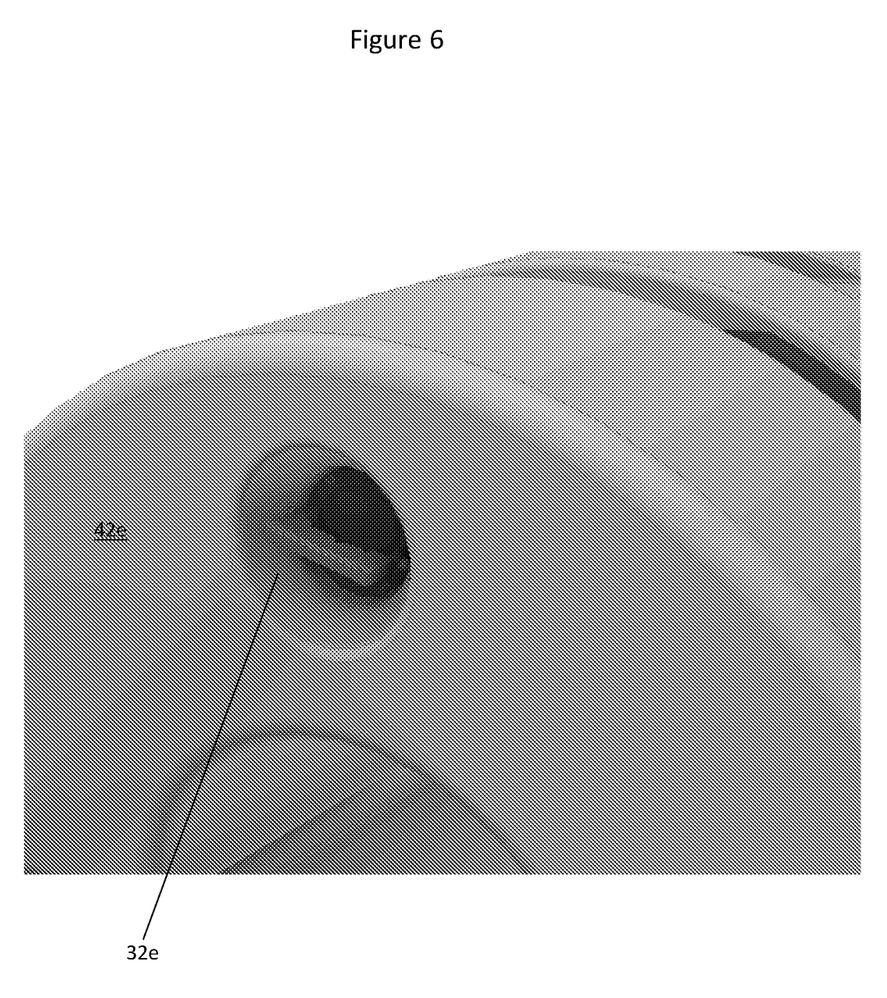

The sensor module dock 32c depicted in FIG. 4 comprises a recess which extends longitudinally (i.e. in a direction roughly parallel to the axis of the buoyancy module 10 and of the elongate member on which it is to be mounted). In this example the recess in question is open to both end face 40c of the buoyancy module 10 and its radially outer face 42c. In the FIG. 5 embodiment the recess forming the sensor module dock 32d again extends longitudinally but in this example it is open toward the split line 38 and toward the end face 40d. In FIG. 6 the recess forming the sensor module dock 32e again extends longitudinally from end face 42e, but in this example it does not open toward any other face of the module.

Figure 7:
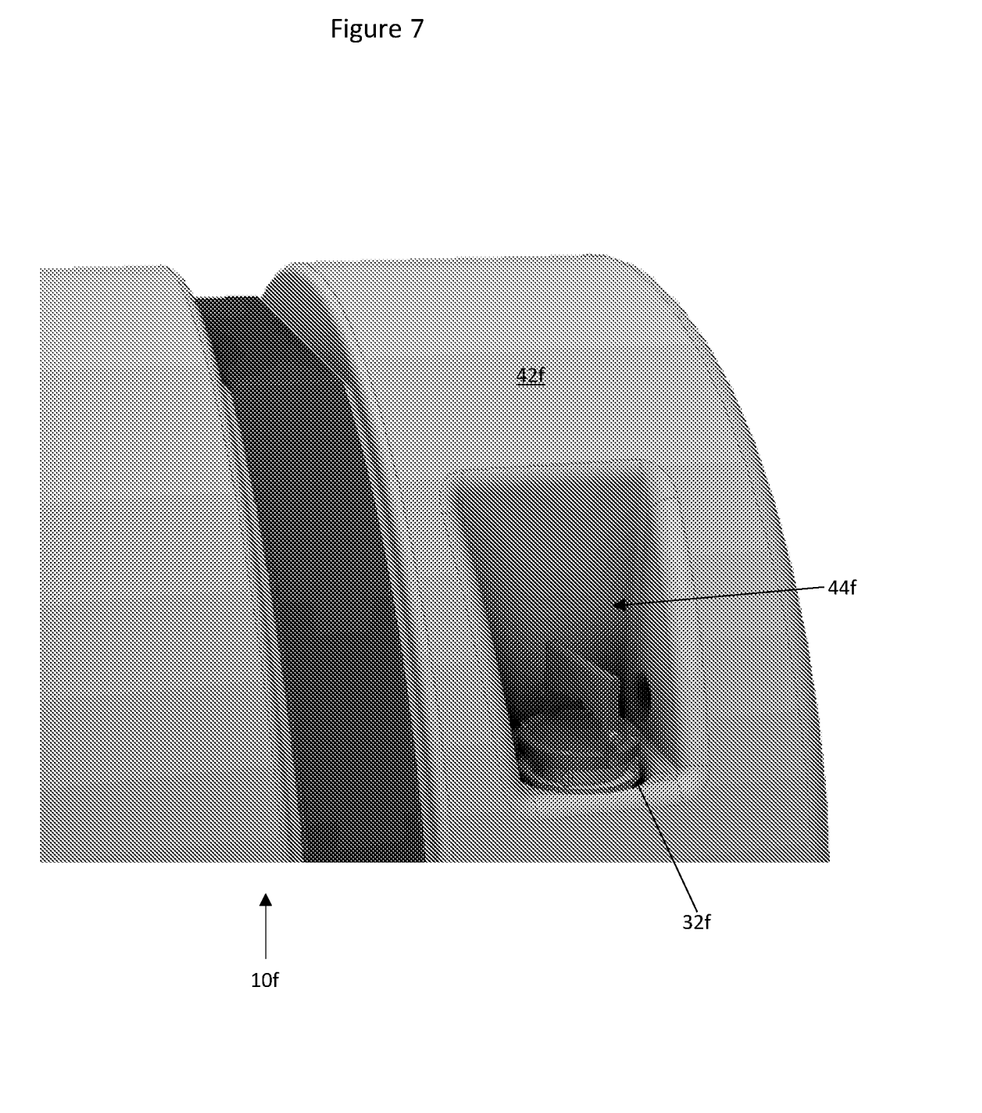

FIG. 7 illustrates another possible orientation of the sensor module dock 32f, which in this case extends along a tangential direction, opening toward an access pocket 44f in the outer face 42f of the buoyancy module 10f.

In certain embodiments some means is provided for releasably retaining the sensor module 30 to the sensor module dock 32. It is desirable that this should be operable in a straightforward manner by means of an ROV. In some embodiments engagement and disengagement of the sensor module 30 is achieved by a certain movement of the sensor module 30 with respect to the buoyancy module 10. This is especially convenient where the sensor module is to be mounted or retrieved using an ROV. A single effector may be used to grasp the sensor module 30 and to move it suitably to lock it in place or to release it.

Figure 8:
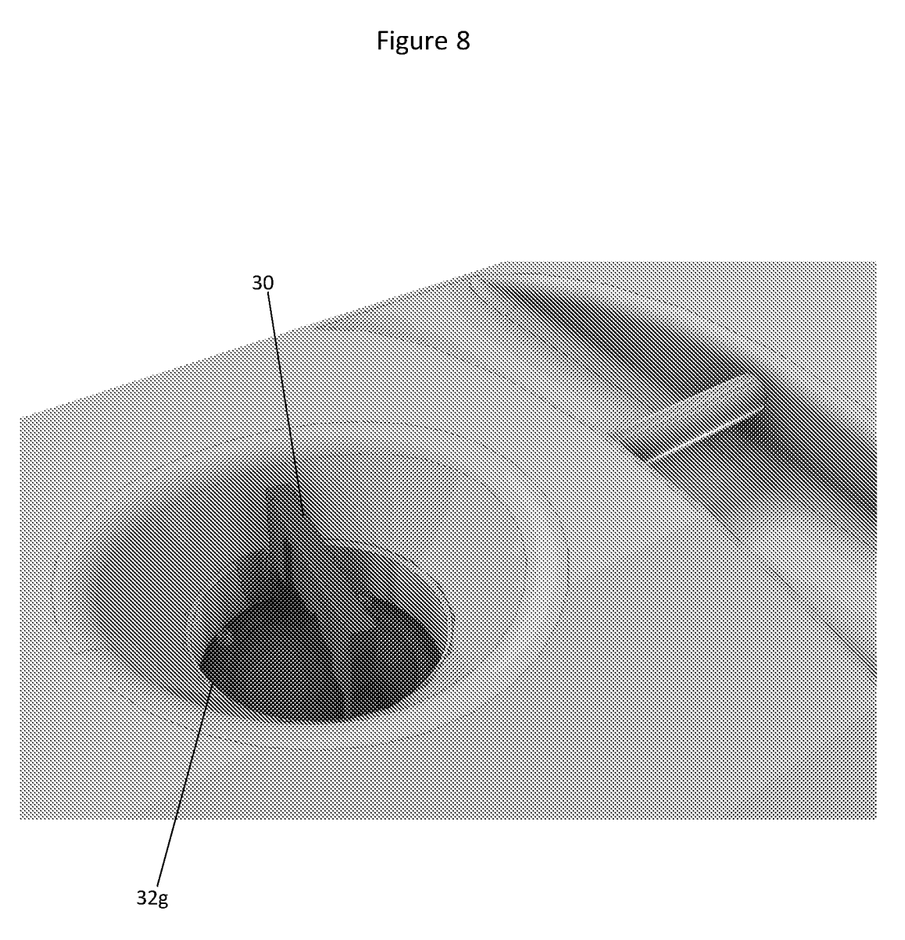
FIGS. 8 to 15 each depict sensor module docks of respective further buoyancy modules embodying the present invention.
Figure 9:
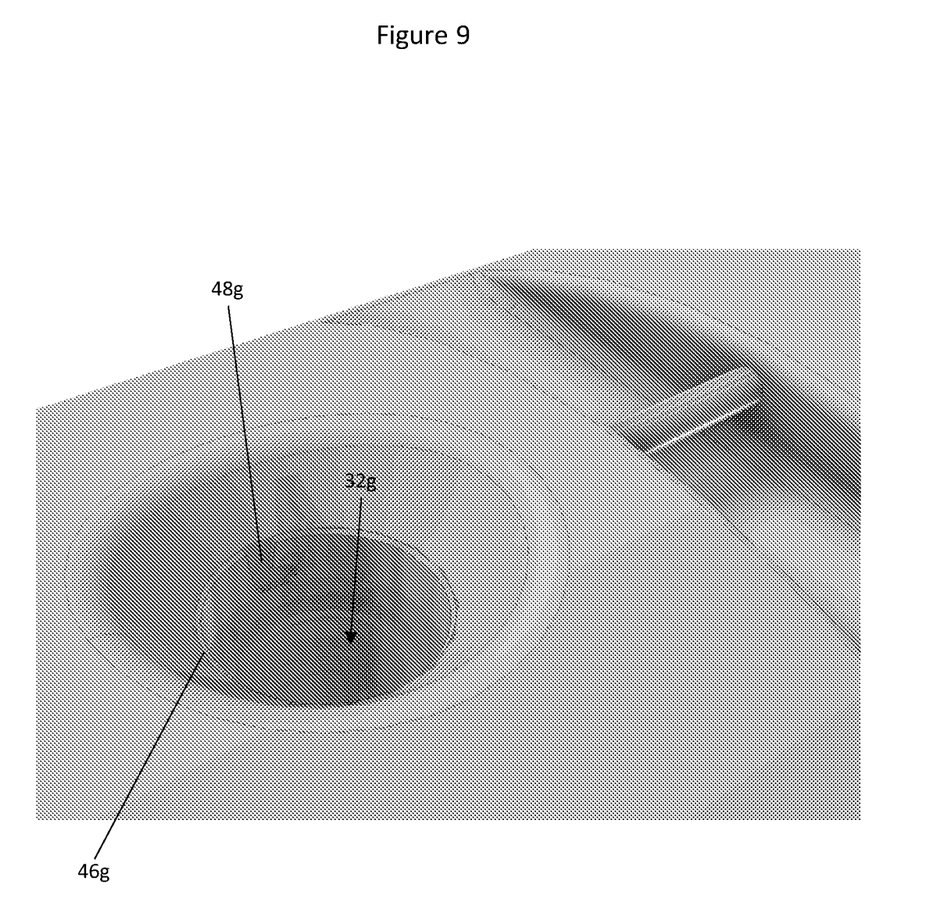

In the embodiment depicted in FIGS. 8 and 9 the sensor module 30 and the sensor module dock 32g are configured to form a part turn lock, and more specifically a bayonet lock. The sensor module dock 32g is seen in FIG. 9 to have at its mouth a collar 46g defining a bayonet locking path 48g to receive a stub (not seen in the drawings) which projects laterally from the sensor module 30. Simply pushing the sensor module 30 into the sensor module dock 32g and turning it slightly engages the lock. Removal of the sensor module 30 is the reverse process.

Figure 10:
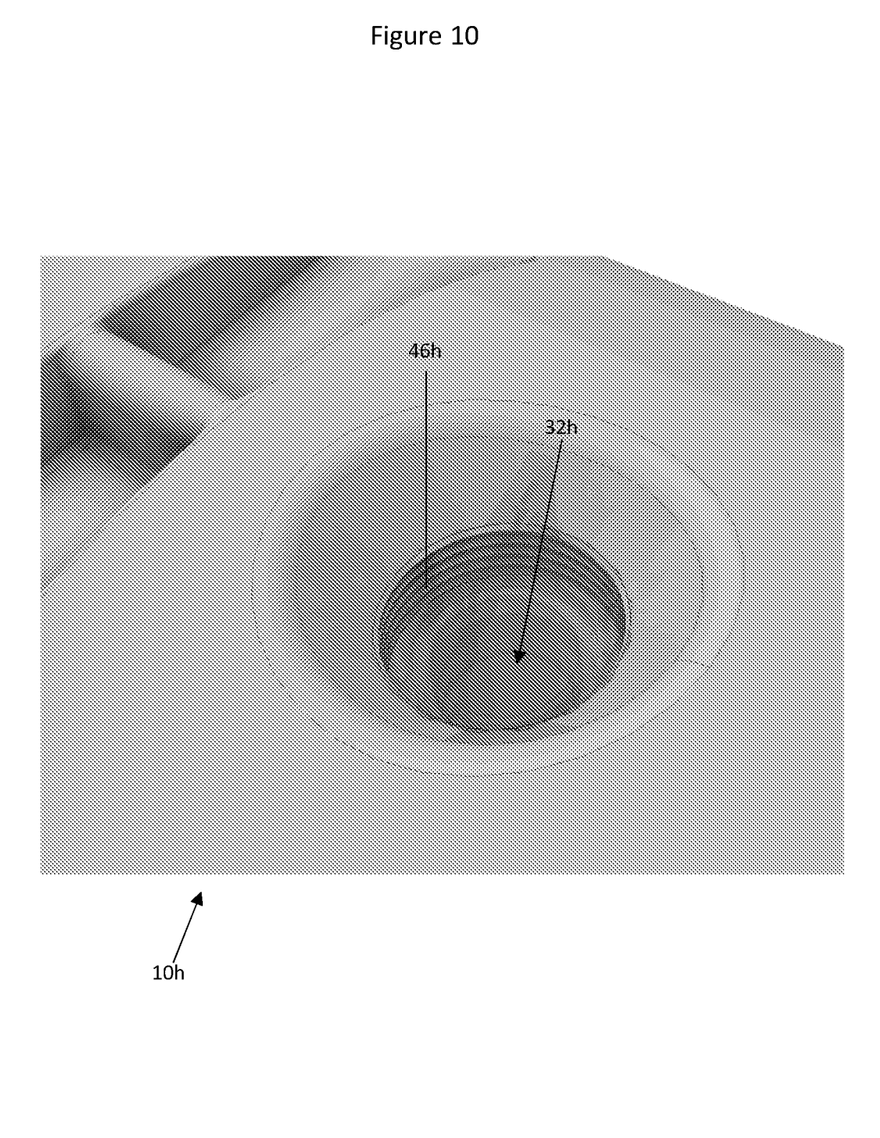
Figure 11:
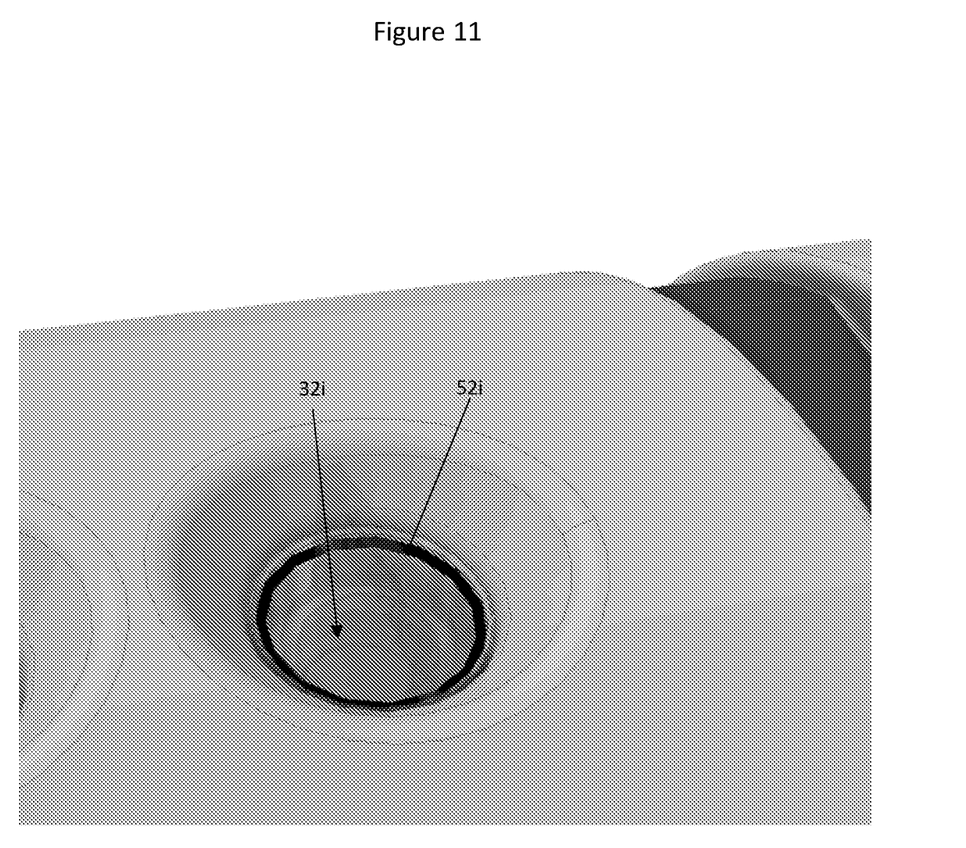

In the embodiment of FIG. 10, collar 46h has an internal screw thread. The sensor module 30 is seen only in phantom but is to be understood to carry a complementary external thread, so that it is simply inserted into the sensor module dock 32h and rotated to engage with the buoyancy module 10h, and again removal is the reverse process.

The engagement of the sensor module 30 with the sensor module dock 32 may be frictional. This could for example be achieved by making one an interference fit with the other. But in the FIG. 12 embodiment a compliant member, which in this example is an O ring 52i, is provided in the recess forming the dock. An alternative would be to provide the compliant member, which could again take the form of an O ring, on the exterior of the sensor module 30. In either case, the compliant member is arranged to be compressed as the sensor module 30 is advanced into the sensor module dock 32*i*, providing sufficient frictional engagement to maintain the sensor module 30 in the dock until it needs to be retrieved.

Figure 12:
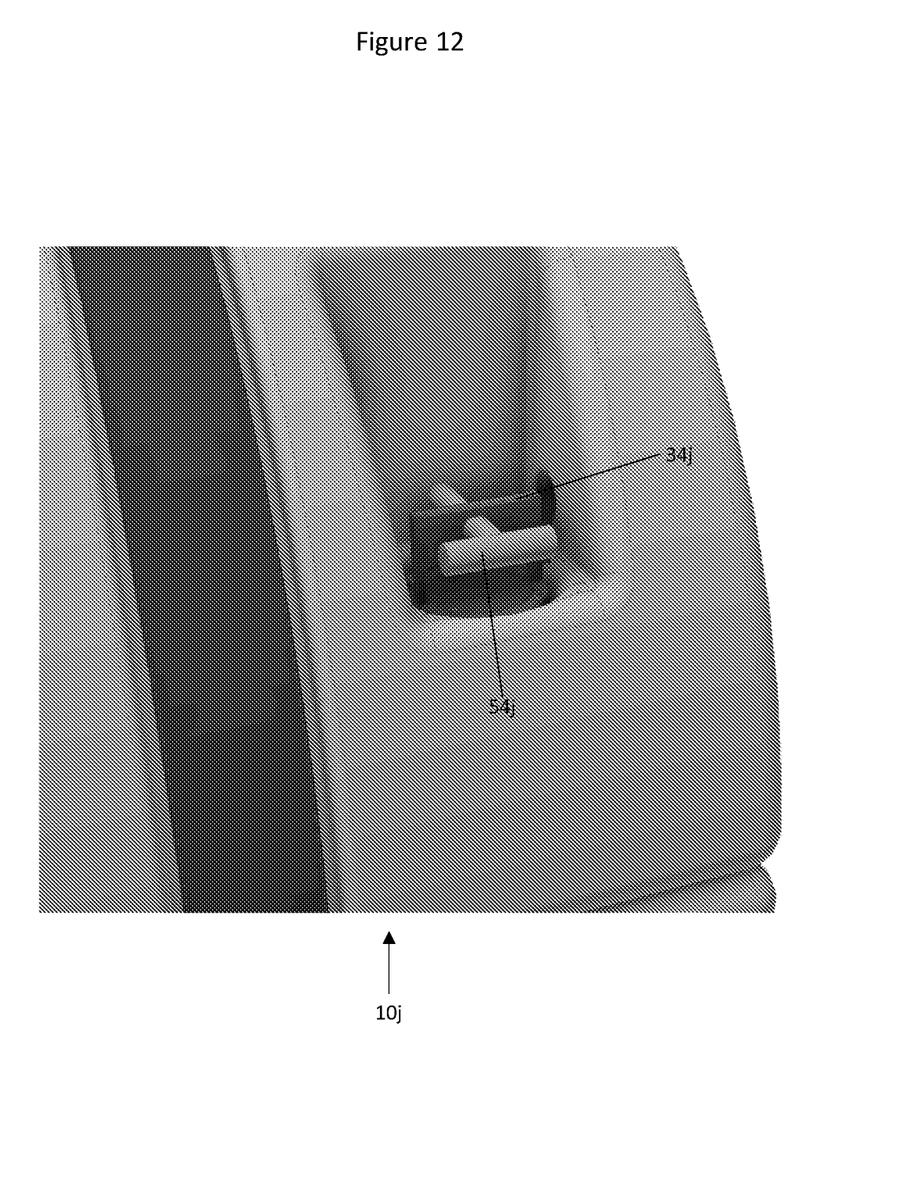

In some embodiments a locking member may be provided to engage between the sensor module 30 and the sensor module dock 32. FIG. 12 provides an example, where "T" bar 54*j* is passed through handle 34*j* of the sensor module 30 and into a complementary bore in the buoyancy module 10*j* to lock the sensor module 30 in position in the dock.

In other embodiments a snap fit action may be used to lock the sensor module 30 in place.

Figure 13:
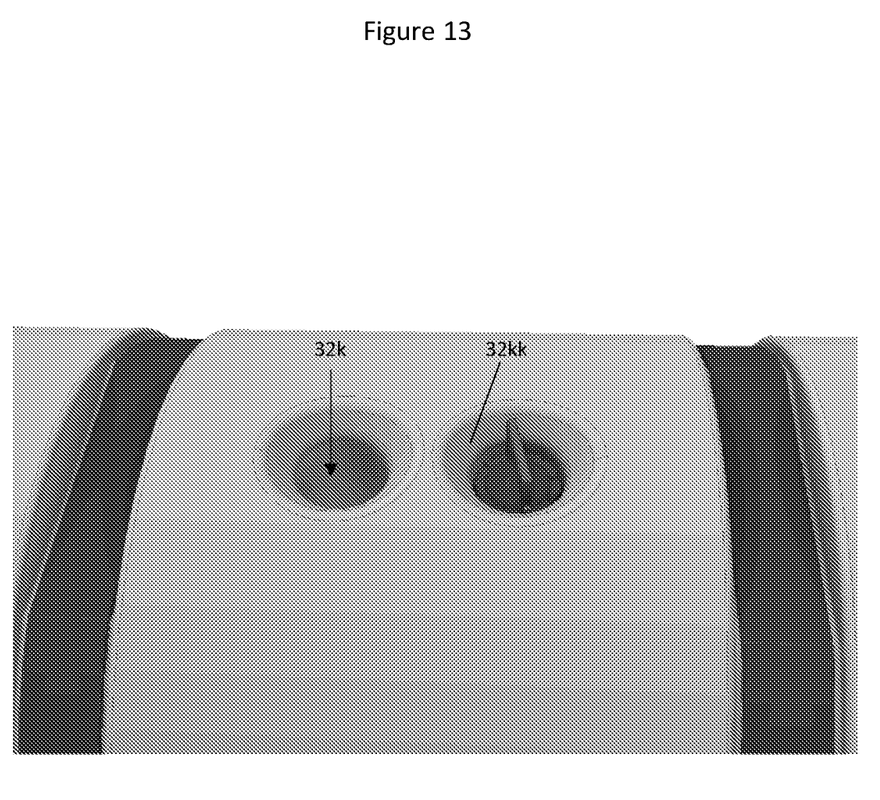

FIG. 13 depicts a buoyancy module having two sensor module docks 32*k* and 32*kk*. This may be used to provide redundancy, or for example to enable two sensor modules 30 to be mounted in tandem. This may for example be used to extend the working lifetime of the arrangement. For example a first sensor module 30 may be activated initially. When that sensor module 30 approaches or reaches the end of its battery life then the other module may be activated.

Figure 14:
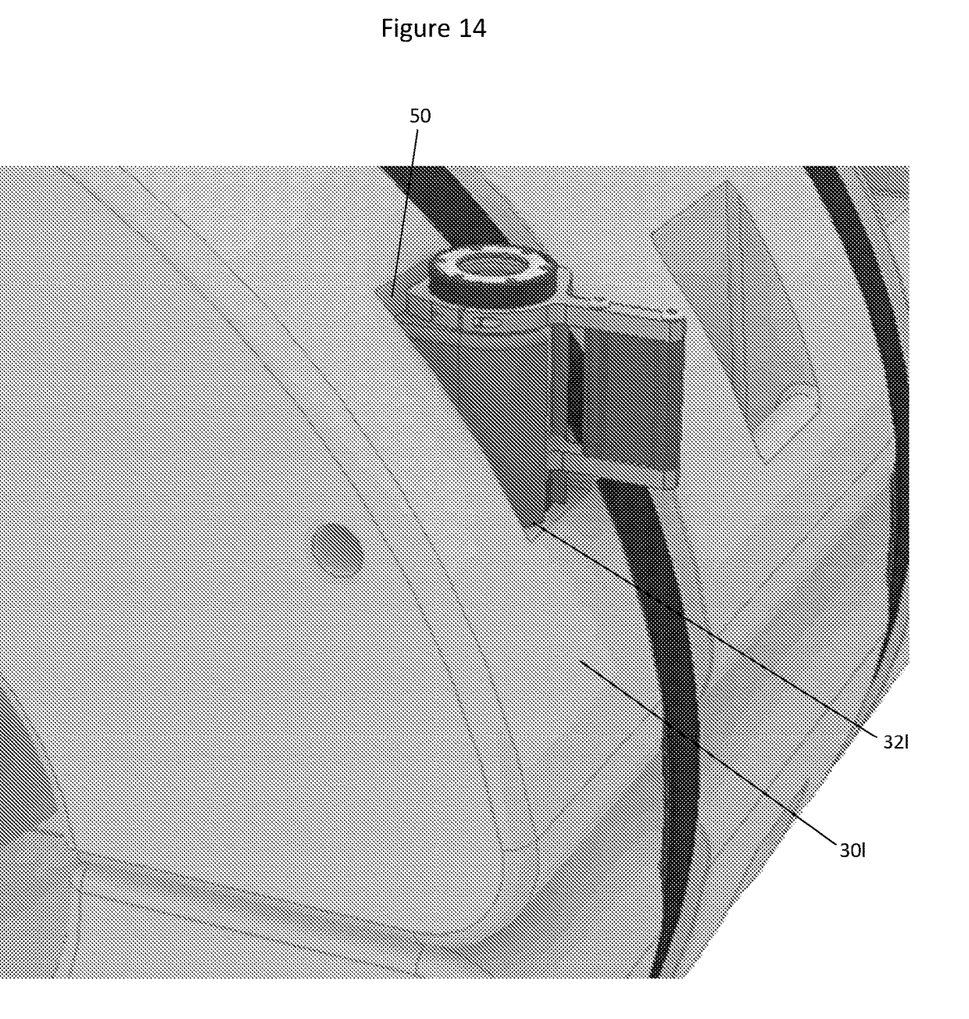

In FIG. 14, sensor module dock 32l is not integrally formed with buoyancy module 30l. Instead, it comprises a separate part secured to the buoyancy module 30l. In this example, the sensor module dock 32l is received and mounted in a recess 50 of the buoyancy module 30l. The recess is provided in existing buoyancy modules for pre-deployment handling: it enables a strap to be passed through a bore 52 so that the module is able to be lifted. Hence this embodiment makes it possible to retro-fit the sensor module dock 32l, and hence the sensor module itself, to existing buoyancy modules.

Figure 15:
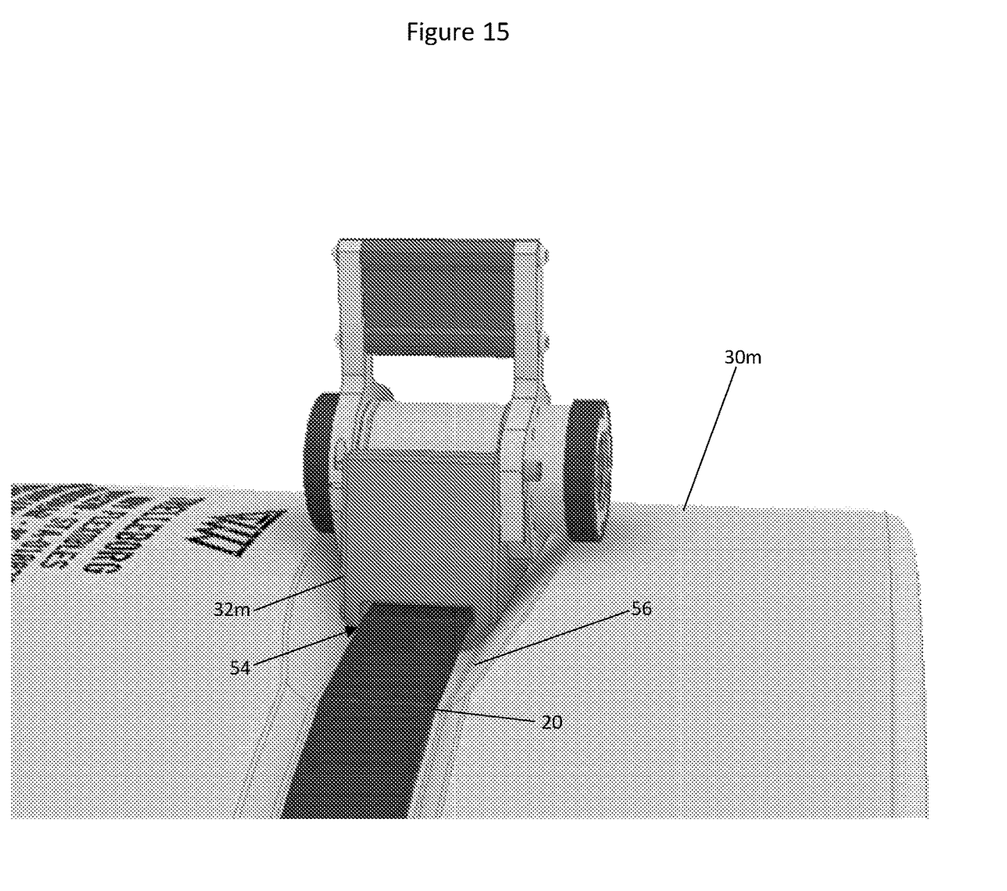

In FIG. 15, sensor module dock 32*m* is again formed as a separate part from buoyancy module 30*m*. Here, tension band 20 is used to secure the sensor module dock 32*m* to the buoyancy module 30*m*. The sensor module dock 32*m* is provided with a through-going passage 54 which receives the tension band 20, and seats in a recess 56 formed at the exterior of the buoyancy module 30*m*.

The sensor module 30 is, in the illustrated embodiments, a self-contained and self-powered unit able to log sensor data and to output it through a suitable interface. It comprises a sealed pressure vessel seen in FIG. 4 to comprise a cylindrical housing 56 with a removable end cap carrying the handle 34. In the illustrated embodiments the handle 34 is of "D" shape, but it could instead comprise for example a "T" bar or a fishtail configuration, either of which is easily graspable by an end effector of an ROV. Sensors provided in or on the sensor module 30 may comprise any of the following, or any combination of the following:

an accelerometer, which may be a MEMs type device. This may be used to sense acceleration of the elongate member 16 directly, or by integration to determine motion of the elongate member or changes of its position, or to sense its orientation with respect to the earth's gravitational field, or any combination of these all of which can be obtained by processing the accelerometer's output. Accelerometry is for example well suited to detection of slug induced or vortex induced vibration;

a temperature sensor;

a pressure sensor, which can for example be used to determine water depth;

a gyroscope or other sensor responsive to angular movement or angular acceleration;

a magnetometer, especially one which is responsive to the earth's magnetic field to determine orientation.

This list is not exhaustive.

In certain embodiments the sensor module 30 is intended to be retrieved to enable its logged sensor data to be downloaded for analysis. This does not preclude the possibility that some analysis of the data will be carried out on-board the sensor module 30, which may be desirable e.g. for the sake of data compression. The present embodiments make retrieval especially easy. The buoyancy module 10 provides a conspicuous visual marker which can easily be found by the ROV, and also provides an easy means for the ROV to suitably orient itself to effect the retrieval.

A range of data interfaces may be used to enable transfer of data from the sensor module 30 to some external processing system. In shallow water applications wireless data exchange may be provided. The sensor modules 30 may be connected in the form of a wireless computer network. At greater depths this is not possible. A short range data interface may be provided, which may be optical, radio frequency, acoustic or some other form of short range communication, so that data can be retrieved during a visit by an ROV, submersible or diver without actual retrieval of the sensor module 30. In other embodiments the sensor module 30 is to be periodically retrieved enabling it to be interrogated. It may then be serviced, which will typically include replacement or re-charging of batteries, before being deployed subsea once more.

The invention claimed is:

1. A system comprising a buoyancy module and a sensor module, the buoyancy module being configured for mounting on an elongate underwater member and having a sensor module dock for receiving and releasably retaining the sensor module, and the sensor module including a closed pressure vessel containing at least one sensor, a data logger for logging data from the sensor, an interface for outputting logged sensor data, and a battery arranged to power the sensor and the data logger.

2. The system as claimed in claim 1, wherein the sensor module dock comprises a recess in the buoyancy module for receiving the sensor module.

3. The system as claimed in claim 2, wherein the buoyancy module comprises a moulding and the sensor module dock is moulded in the buoyancy module.

4. The system as claimed in claim 2, wherein the sensor module dock is configured to mechanically engage with the sensor module to releasably retain the sensor module.

5. The system as claimed in claim 4, wherein the sensor module dock comprises a collar disposed to receive the sensor module and configured to form a part turn lock.

6. The system as claimed in claim 5, wherein the collar comprises a bayonet locking path.

7. The system as claimed in claim 1, wherein the buoyancy module has a longitudinal axis and in which the sensor module dock comprises a recess extending substantially axially to receive the sensor module along a substantially axial direction.

8. The system as claimed in claim 1, wherein the buoyancy module has a longitudinal axis and in which the sensor module dock comprises a recess extending substantially radially to receive the sensor module along a substantially radial direction.

9. The system as claimed in claim 1, wherein the buoyancy module comprises two buoyancy module parts which abut along a split line and in which the sensor module dock comprises a recess which is open toward the split line.

10. The system as claimed in claim 1, wherein the buoyancy module has end faces and the sensor module dock is provided in one of the end faces.

11. The system as claimed in claim 1, wherein the buoyancy module includes a through-passage to receive the elongate underwater member.

12. The system as claimed in claim 11, wherein the buoyancy module comprises two or more buoyant parts configured to be secured to one another around the elongate underwater member.

13. The system as claimed in claim 1 further comprising an ROV location feature comprising a handle, a grab bar or other shaped item configured to be grasped by an effector of an ROV to locate the ROV while it retrieves the sensor module.

14. The system as claimed in claim 1, wherein the sensor module is retainable frictionally in the sensor module dock.

15. A system comprising a buoyancy module and a sensor module, the buoyancy module being configured for mounting on an elongate underwater member and having a sensor module dock for receiving and releasably retaining the sensor module, the sensor module including a closed pressure vessel and having a grab bar, a handle or other graspable feature to be grasped by an effector of an ROV to facilitate release and retrieval of the sensor module from the buoyancy module.

16. The system as claimed in claim 15, wherein the sensor module dock comprises a collar disposed to receive the sensor module and configured to form a part turn lock.

17. The system as claimed in claim 15, wherein the collar comprises a bayonet locking path.

18. A buoyancy module being configured for mounting on an elongate underwater member and having a sensor module dock for receiving and releasably retaining a sensor module, wherein the sensor module dock comprises a collar disposed to receive the sensor module and configured to form a part turn lock.

19. The buoyancy module as claimed in claim 18, wherein the collar comprises a bayonet locking path.

20. The buoyancy module as claimed in claim 18, wherein the sensor module dock comprises a recess in the buoyancy module for receiving the sensor module.

\* \* \* \* \*